United States Patent [19]

Segoshi et al.

[11] Patent Number: 4,976,529
[45] Date of Patent: Dec. 11, 1990

[54] SOLDERING MATERIAL FOR SPECTACLE FRAME AND SPECTACLE FRAME IN WHICH SAID SOLDERING MATERIAL IS USED

[75] Inventors: Kazuo Segoshi; Toshiyuki Okuda; Kenji Okamura; Mizuo Yoshida, all of Fukui, Japan

[73] Assignee: Sigma Co., Ltd., Fukui, Japan

[21] Appl. No.: 337,255

[22] Filed: Apr. 13, 1989

[30] Foreign Application Priority Data

Apr. 28, 1988 [JP] Japan ................. 63-104316

[51] Int. Cl.$^5$ .................... G02C 5/14; G02C 5/02
[52] U.S. Cl. ........................ 351/41; 351/111; 351/124; 420/465; 420/501; 420/555
[58] Field of Search ............ 351/41, 88, 111, 121, 351/124, 136, 153, 154; 420/463, 465, 501, 505, 555

[56] References Cited

FOREIGN PATENT DOCUMENTS 3304598 8/1984 Fed. Rep. of Germany ...... 420/555
0222139 10/1986 Japan ............................. 420/555

OTHER PUBLICATIONS

Braterskaya et al., "Production & Application of a Silver-Base Electrical Contact Material with a Liquid Lubricant", Soviet Powder Metallurgy and Metal Ceramics, vol. 16, No. 1, 1/77—pp. 23 & 24.

Primary Examiner—Rodney B. Bovernick
Attorney, Agent, or Firm—Kenyon & Kenyon

[57] ABSTRACT

A shape memory alloy is used for face-contacting parts (1, 3, 4, 5; 101) and lens-fixing parts (2) of a spectacle frame, and parts (12, 13; 103) connected thereto are formed of titanium, a titanium alloy, nickel, or a chromium alloy. These parts are suitable soldered by a soldering material (111) formed of 5–15 wt. % of palladium, 5–15 wt. % of gallium, and a balance consisting of silver.

7 Claims, 3 Drawing Sheets

SOLDERING MATERIAL FOR SPECTACLE FRAME AND SPECTACLE FRAME IN WHICH SAID SOLDERING MATERIAL IS USED

BACKGROUND OF THE INVENTION:

The present invention relates to a soldering material for a spectacle frame produced by soldering metal parts to shape memory alloy parts as well as a spectacle frame produced by using said soldering material.

In recent years, a shape memory alloy has come to be used widely as a material for face-contacting portions of a spectacle frame, such as sides, for comfortably fitting with the user's face and lens-fixing portions such as a rim. A member for connecting such members needs to be provided with drilling, tapping, cutting and other similar machining operations, so that it is necessary to use for such a member a metal which allows such machining operations to be performed readily. In addition, these members need to be soldered, and in the case of a spectacle frame disclosed in Japanese Patent Application No. 67825/1987 filed by the present applicant, a palladium-based soldering material, e.g. silver palladium, is used.

The soldering material based on silver palladium (hereafter referred to as Ag-Pd) used in the above-described application has poor wettability with respect to a shape memory alloy material (hereafter referred to as an SM material) used in face-contacting portions or lens-fixing portions of a spectacle frame, and there has been demand for making improvements on the finishing qualities and productivity.

The wettability referred to here constitutes an important factor in jointing by means of soldering. Generally speaking, an ideal soldering gap is approximately 0.05 mm, and the soldering material fused by heating flows through the gap by means of surface tension and spreads over the entire soldering portion. In this case, if the wettability is poor, the flow between the gap also becomes poor and it is difficult for the soldering material to spread. Consequently, this undesirably results in a lack of jointing strength and the exfoliation of solder.

Soldering materials in general are poor in wettability with respect to SM materials, so that the soldering material extrudes to outside the jointing surface in the form of a lump, which is unsightly. In addition, when such solder is plated, it becomes difficult for the plating to be formed on a member such as a side, a difference in the electric potential occurs between the member and the soldering material, possibly resulting in corrosion due to the battery action. As a result, with such conventional soldering materials, there have been disadvantages in that the strength of the jointed portion subsequently declines and that the deterioration thereof with time is accelerated.

SUMMARY OF THE INVENTION

Accordingly, an object of the present invention is to provide a soldering material for a spectacle frame whose wettability with respect to a shape memory alloy is improved and which allows a gap or the like to be eliminated from a soldered portion, as well as a spectacle frame soldered by using said soldering material, thereby overcoming the above-described drawbacks of the conventional art.

To attain the above-described and other objects, in accordance with one aspect of the present invention there is provided a soldering material for a spectacle frame, characterized by being formed of 5-15 wt.% of palladium, 5-15 wt.% of gallium, and a balance consisting of silver. In addition, in accordance with another aspect of the present invention there is provided a spectacle frame, characterized by comprising parts formed of a shape memory alloy and parts formed of titanium, a titanium alloy, nickel, or a chromium alloy, wherein soldering portions of the parts are soldered by using the above-described soldering material.

The spectacle frame produced by using the above-described soldering material has advantages in that the spectacle frame has excellent wettability, and its soldered portions are free of defects such as gaps and pinholes and are highly resistant against deterioration with time.

The above and other objects, features and advantages of the present invention will become more apparent from the following detailed description of the invention when read in conjunction with the accompanying drawings.

DESCRIPTION OF THE PREFERRED EMBODIMENT

Figure 1:
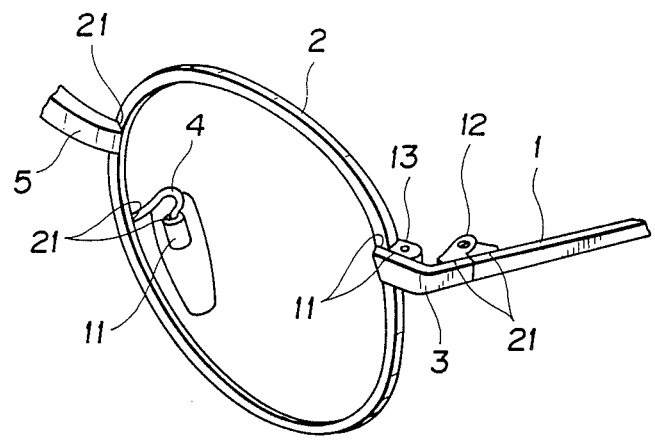
FIG. 1 is a perspective view of a part of a spectacle frame in which parts are soldered by using a soldering material in accordance with the present invention.

FIG. 1 is a perspective view of a part of a spectacle frame in accordance with the present invention. A side 1 is connected to a lug 3 via a hinge 12, and the lug 3 is connected to a rim 2, which serves as a lens fixing member, via a brow lug 13. The rim 2 is connected to the other rim (not shown) via a bridge 5. In addition, the rim 2 is provided with a pad arm 4 connected with a stud case 11. These members are secured by soldering, and portions requiring soldering are denoted by reference numeral 21. In addition, the side 1, the rim 2, the lug 3, the pad arm 4, and the bridge 5 are respectively formed of an SM alloy material formed in such a manner as to retain an optimum configuration at normal temperature. The stud case 11, a joint 12, and the brow lug 13 are provided with precision machining including cutting, drilling, and tapping. In accordance with the present invention, a soldering material comprising 5-15 wt.% of palladium (Pd), 5-15 wt.% of gallium, and a balance consisting of silver (Ag) was used for each of these connecting portions. In addition, in accordance with the present invention, a spectacle frame was produced by soldering the face-contacting portions and the lens-fixing portions made of an SM alloy material on the one hand, and parts made of a titanium (Ti) material, a titanium alloy, or a generally-employed nickel (Ni) and chromium (Cr) alloy on the other, by using the soldering material having the above-described components.

Figure 2:
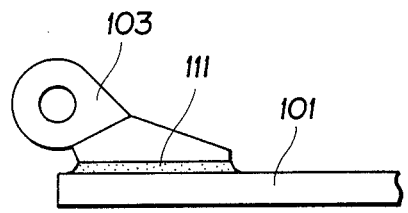
FIG. 2 is an enlarged view of a soldering portion in accordance with the present invention.
Figure 5:
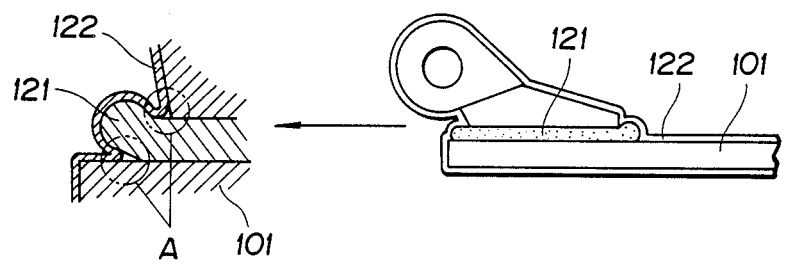
FIG. 5 is a diagram illustrating a plating finish in accordance with a conventional means.

Since soldering is effected by using the soldering material having the above-described components in accordance with the present invention, a favourable soldered condition can be obtained, as shown in FIG. 2, without being extruded to outside a soldering surface in the form of a lump as in the case of the conventional example shown in FIG. 2. In addition, when plating is carried out on a soldered part, deposition can be allowed to take place in such a manner as to be free of undeposited portions, which can otherwise remain as indicated by reference character A in FIG. 5. The state of this plating finish shown in FIG. 5 can be compared with that shown in FIG. 3, which illustrates an optimum state of plating finish using the soldering material in accordance with the present invention.

In FIGS. 2 to 5, reference numeral 101 denotes a side; 103 denotes a connecting portion; 111, 121 denote soldering portions; and 112, 122 denote plating portions.

Figure 6:
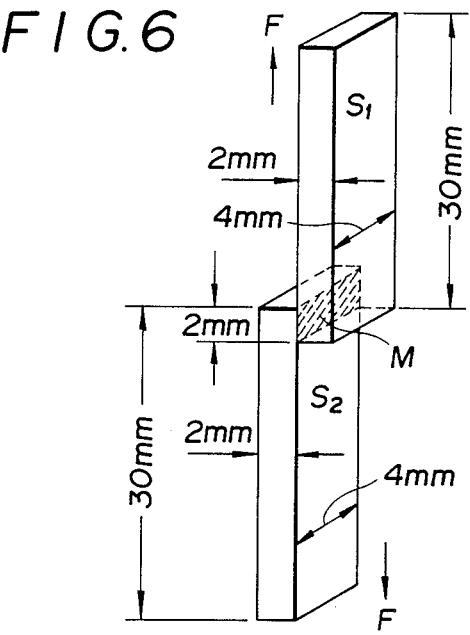
FIG. 6 is a diagram illustrating a method of measuring the soldering strength.
Figure 7:
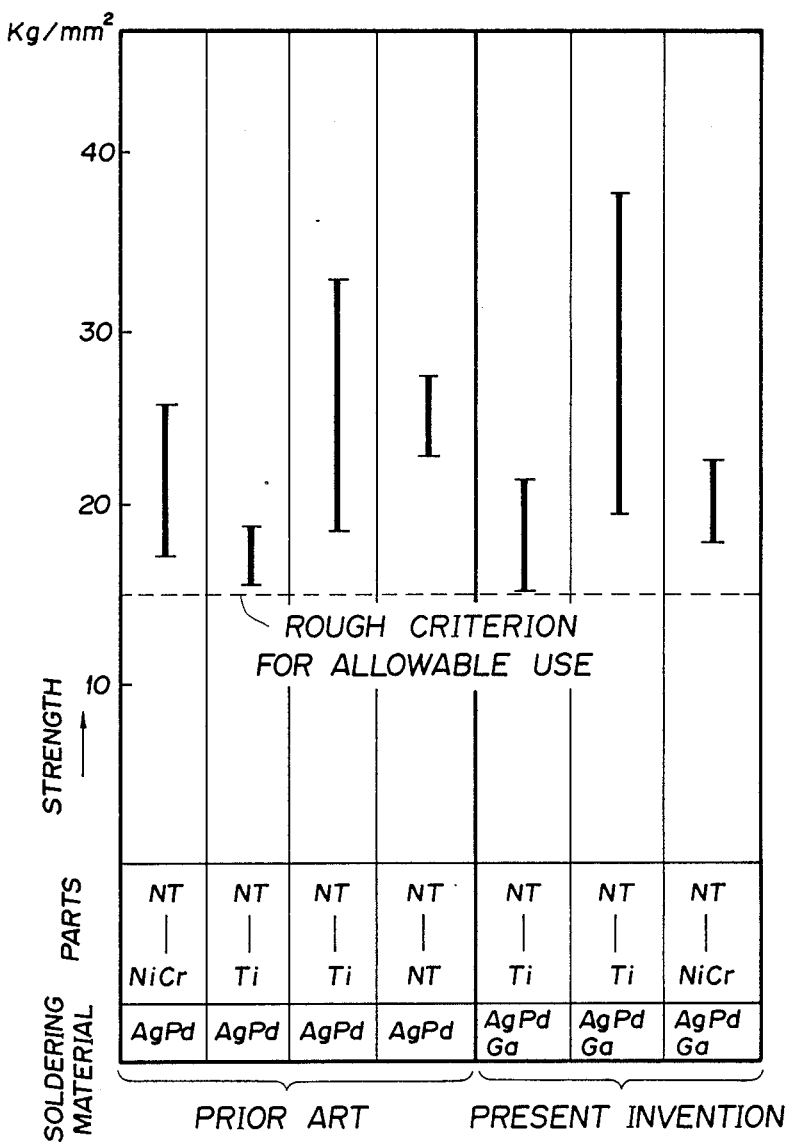
FIG. 7 is a table of soldering strength.

FIG. 7 is a diagram illustrating the soldering strength between the respective members of the spectacle frame formed by using the soldering material in accordance with the present invention and those of the spectacle frame formed by using a soldering material in accordance with the prior art. In the drawing, thick bar portions are based on test results of samples in which soldering was effected in the mode shown in FIG. 6. Namely, in FIG. 6, a soldering material containing 9 wt.% of Pd, 9 wt.% of Ga, and a balance consisting of Ag was used as samples S;, Sz to be jointed, and the jointing was effected at the soldering surface M. The samples thus soldered were pulled vertically with a tensile strength F to measure the soldering strength. A tension test was conducted ten times or more for each sample, and the results are shown in FIG. 7. In each case, a strength which was higher than the illustrated line of a rough criterion for allowing use was measured.

As can be seen from these test results, if the soldering material having the components in accordance with the present invention is used, the strength of the soldering material is no inferior to that of the conventional Ag-Pd-based soldering material, its wettability with respect to SM alloy-made parts is excellent, and its wettability with respect to a Ti material, a Ti alloy and a generally-used NiCr alloy is also excellent.

Figure 3:
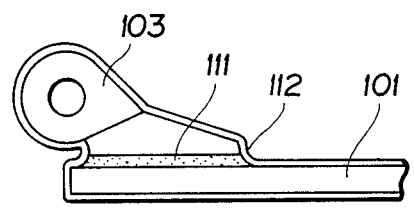
FIG. 3 is a diagram illustrating a plating finish in accordance with the present invention.
Figure 4:
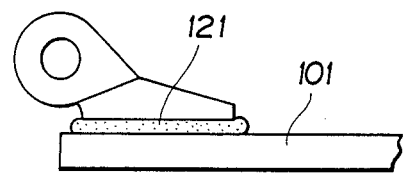
FIG. 4 is an enlarged view of a soldering portion in accordance with a conventional means.

Accordingly, as shown in FIG. 2, if two members are soldered, the soldering material flows smoothly over the surfaces of the two members, and the appearance after finish is not only favourable but free of the so-called defects of soldered parts (gaps, pinholes, etc.). In addition, soldered portions are not susceptible to deterioration with time. In particular, if the external surface is placed as shown in FIG. 3, a plating layer is flatly deposited on the soldered surface, so that its external appearance is extremely favourable.

In addition, as for the ratio of components of the soldering material, insofar as the ratio is in the range of 5-15 wt.% of, 5-15 wt.% of Ga, and a balance consisting of Ag, it is possible to obtain a desired wettability and strength.

In a modified embodiment, litium (Li) may be substituted with gallium.

What is claimed is:

1. A soldering material for a spectacle frame, characterized by being formed of 5-15 wt.% of palladium, 5-15 wt.% of gallium, and a balance consisting of silver.

2. A spectacle frame, characterized by comprising parts (1, 2, 3, 4, 5; 101) formed of a shape memory alloy and parts (12, 13; 103) formed of titanium, wherein soldering portions of said parts are soldered by a soldering material (111) formed of 5-15 wt.% of palladium, 5-15 wt.% of gallium, and a balance consisting of silver.

3. A spectacle frame according to claim 2, wherein said parts (1, 2, 3, 4, 5; 101) formed of said shape memory alloy are used as face-contacting parts including a side (1; 101) and lens-fixing portions including a rim (2).

4. A spectacle frame, characterized by comprising parts (1, 2, 3, 4, 5; 101) formed of a shape memory alloy and parts (12, 13; 103) formed of a titanium alloy, wherein soldering portions of said parts are soldered by a soldering material (111) formed of 5-15 wt.% of palladium, 5-15 wt.% of gallium, and a balance consisting of silver.

5. A spectacle frame according to claim 4, wherein said parts (1, 2, 3, 4, 5; 101) formed of said shape memory alloy are used as face-contacting parts including a side (1; 101) and lens-fixing portions including a rim (2).

6. A spectacle frame, characterized by comprising parts (1, 2, 3, 4, 5; 101) formed of a shape memory alloy and parts (12, 13; 103) formed of nickel or a chromium alloy, wherein soldering portions of said parts are soldered by a soldering material (111) formed of 5-15 wt.% of palladium, 5-15 wt.% of gallium, and a balance consisting of silver.

7. A spectacle frame according to claim 6, wherein said parts (1, 2, 3, 4, 5; 101) formed of said shape memory alloy are used as face-contacting parts including a side (1; 101) and lens-fixing portions including a rim (2).

* * * * *